United States Patent [19]

Thorn et al.

[11] 3,724,571
[45] Apr. 3, 1973

[54] HYDRAULIC LOAD INDICATING DEVICE

[75] Inventors: John E. Thorn, Chigwell Row; Alan A. Selman, Southend-on-Sea, both of England

[73] Assignee: Ford Motor Company, Dearborn, Mich.

[22] Filed: June 25, 1970

[21] Appl. No.: 49,692

[30] Foreign Application Priority Data

Aug. 26, 1969 Great Britain....................42,425/69

[52] U.S. Cl. ................177/141, 177/137, 177/208, 177/209
[51] Int. Cl. ..........................G01g 19/10, G01g 5/00
[58] Field of Search....................177/136–138, 141, 177/208, 209; 73/141 A, 141 AB

[56] References Cited

UNITED STATES PATENTS

| | | |
|---|---|---|
| 1,432,631 | 10/1922 | Sonnlechner et al.................177/138 |
| 3,150,729 | 9/1964 | Mehki....................177/141 |
| 3,241,626 | 3/1966 | Woodburn ...........................177/137 |
| 1,147,128 | 7/1915 | Troll.................................177/137 X |
| 1,532,835 | 4/1925 | Schlabach .......................177/209 X |
| 2,482,027 | 9/1949 | Poole.............................177/136 X |
| 1,227,503 | 5/1917 | Troll...............................177/209 |
| 1,877,980 | 9/1932 | Schafer............................177/209 X |
| 1,995,996 | 3/1935 | Moore..............................177/208 X |
| 2,109,460 | 3/1938 | Brasher.........................177/208 UX |
| 2,472,689 | 6/1949 | Adams et al......................177/209 X |
| 2,830,804 | 4/1958 | Fisher.............................177/209 |
| 2,867,433 | 1/1959 | Bergenheim et al...........177/208 UX |
| 3,147,616 | 9/1964 | Rome ..............................177/208 X |

FOREIGN PATENTS OR APPLICATIONS

| | | |
|---|---|---|
| 1,353,831 | 1/1964 | France .....................177/137 |
| 512,620 | 7/1952 | Belgium ...........................177/209 |
| 736,658 | 6/1966 | Canada ............................177/141 |
| 574,901 | 4/1924 | France .............................177/141 |
| 1,535,073 | 6/1968 | France .............................177/209 |
| 509,640 | 7/1939 | Great Britain.......................177/141 |
| 1,081,977 | 9/1967 | Great Britain.......................177/141 |

Primary Examiner—Richard B. Wilkinson
Assistant Examiner—Stanley J. Witkowski
Attorney—John R. Faulkner and Clifford L. Sadler

[57] ABSTRACT

A hydraulic device is interposed between the vehicle spring and a wheel support member of a motor vehicle suspension system. The device contains an expansible chamber that changes its volume in proportion to the vehicle loading. The chamber volume is sensed by an indicator that gives a reading to the vehicle operator of the load being carried by the vehicle.

5 Claims, 3 Drawing Figures

INVENTORS
JOHN E. THORN
ALAN A. SELMAN
BY John R. Faulkner
Clifford L. Sadler
ATTORNEYS

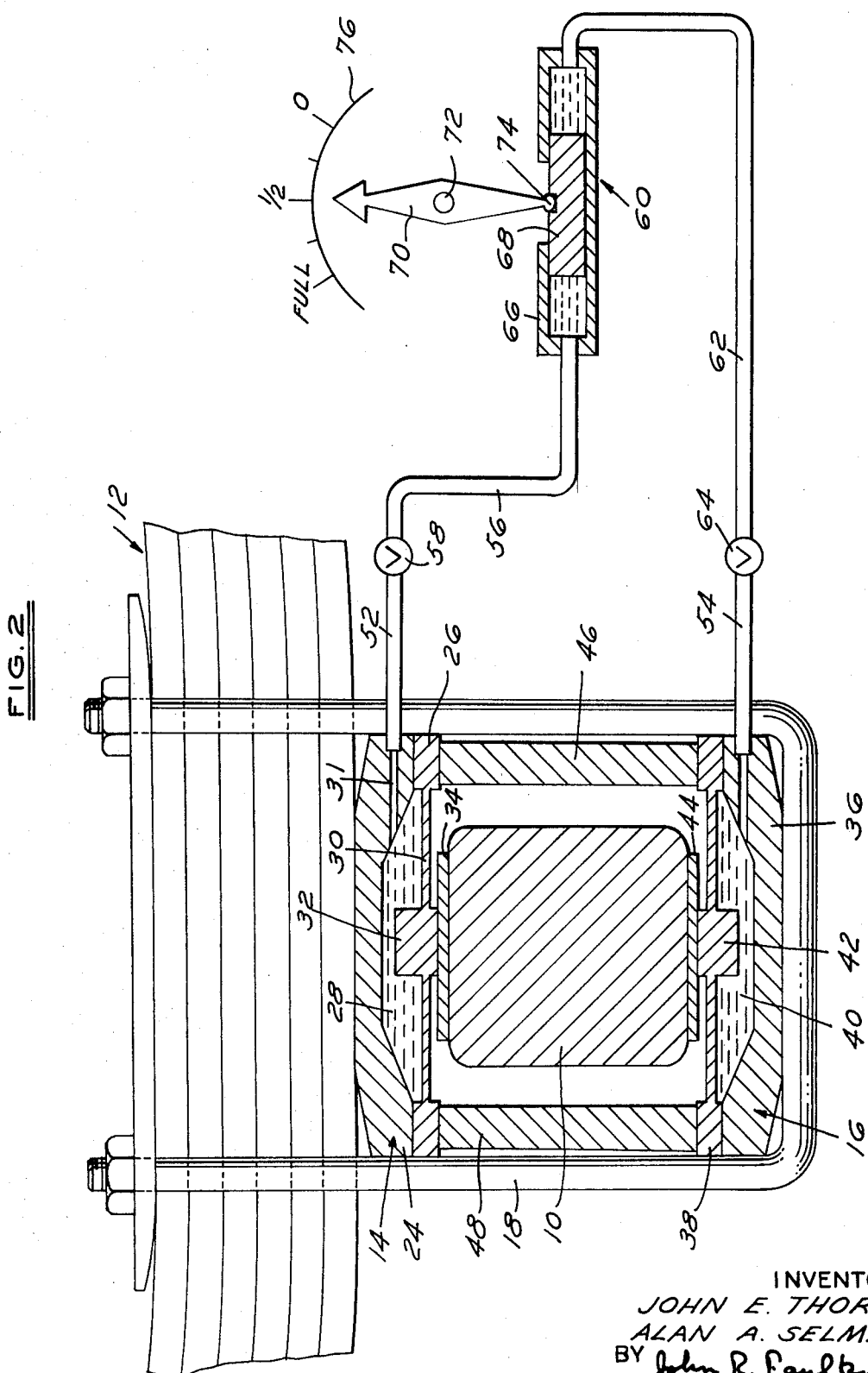

HYDRAULIC LOAD INDICATING DEVICE

BACKGROUND OF THE INVENTION

This invention relates to devices for indicating or measuring the load of a motor vehicle or the load on a particular wheel or axle of the vehicle.

In order to comply with regulations relating to the loading of commercial motor vehicles and in order to avoid overloading or unsafe distribution of loads, it is necessary to frequently measure the axle loading of such vehicles. The present method of weighing loaded vehicles involves driving the vehicle onto a weighing device such as a permanent or portable scale. The scale gives the amount of load on each wheel or on each axle, depending upon how it is constructed.

This is clearly inconvenient and a system installed permanently in the vehicle to indicate the magnitude of the load on each axle would be of considerable utility. A simple system of this kind might measure the static deflection of the suspension spring which varies with the load carried by the vehicle. Springs of the kind used in motor vehicles, however, are subject to hysteresis and permanent set. The static deflection of the vehicle spring, therefore, may not bear an accurate relationship to axle loading.

In view of the state of the art, it is one of the principal objects of the present invention to provide an efficient simple and compact measuring device having load sensors permanently situated between the vehicle springs and the axle for the purpose of measuring vehicle loading.

BRIEF SUMMARY OF THE PREFERRED EMBODIMENT

In one preferred embodiment of the present invention, a motor vehicle has a leaf spring suspension with a pair of leaf spring assemblies secured to the outer ends of the vehicle axle. A pair of hydraulic sensing devices is interposed between each spring and the axle. The sensors each contain an expansible chamber with one wall that is constructed to flex in response to changes in vehicle loading.

The several sensors are interconnected to an indicator device situated on the instrument panel in the cab of the vehicle. The indicator has a floating piston that is constructed to be displaced in response to changes in the volume of the chambers in the load sensors.

The flexing of the walls of the sensor chambers, in response to an increase or decrease in vehicle loading, changes the volume of the chambers and this volume change is hydraulically transmitted to the indicator device. The piston in the indicator moves in response to the fluid displaced. The indicator devices includes a scale and a pointer, which is connected to the piston, in order to obtain a direct reading that is proportional to the load on the vehicle axle.

GENERAL DESCRIPTION OF THE DRAWING

The many objects and advantages of the present device will become apparent from the following description and the accompanying drawings, in which:

FIG. 2 shows the load sensing device of FIG. 1, partially in sectional view, and assembled with the vehicle axle and spring. An indicator mechanism is connected to the load sensing device.

DETAILED DESCRIPTION OF THE PREFERRED EMBODIMENT

Figure 1:
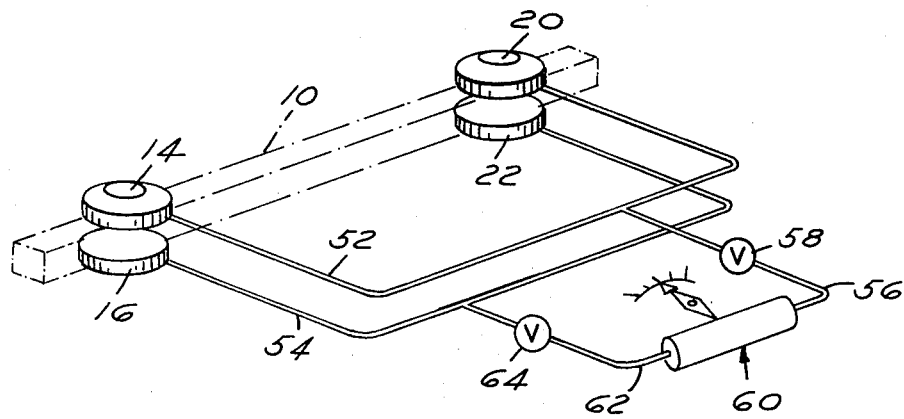
FIG. 1 is a schematic representation of an axle load measuring system for a motor vehicle embodying the present invention.

Referring now to the drawings, wherein the presently preferred embodiment of this invention is shown, a truck or other commercial vehicle has an unsprung mass which includes a vehicle body (not shown) supported by means of leaf springs 12. A pair of load sensing devices are interposed between each leaf spring 12 and the axle 10 as shown in FIG. 2.

Load sensing devices 14 and 16 are arranged in pairs and secured to either side of the axle 10 by U-bolts 18. As illustrated in FIG. 1, the load sensors 14 and 16 are situated near one outer end of the axle 10. Similarly, a pair of load sensors 20 and 22 are secured near the other end of the axle 10. As at the first end of the axle, U-bolts (not shown) secure the sensors 20 and 22 in position with respect to the other end of the axle 10 and a leaf spring (not shown).

Referring to FIG. 2, the sensor 14 includes a rigid upper housing member 24 having a generally concave shape. A flexible member 26 closes the concavity of the member 24 whereby an internal chamber 28 is defined with the member 26 forming one flexible wall of the chamber 28. A passage 31 in the housing 24 is connected to the chamber 28. The flexible member 26 has a diaphragm portion 30 and a centrally situated enlarged boss 32. The boss 32 limits the deflection of the flexible member 26 by its engagement with the inner wall surface of the cavity in the member 24. The boss 32 also extends from the opposite side of the flexible member 26 and engages a plate 34 resting on the axle 10.

The lower load sensor 16 is similarly constructed and includes a concave rigid member 36 and a flexible member 38 which combine to define a chamber 40. The central enlarged boss 42 of the flexible member 38 engages the plate 44 positioned adjacent the lower side of the axle 10.

Two metal spacers 46 and 48 are interposed between the flexible members 26 and 38 and separate the load sensors 14 and 16. The entire assembly comprising the load sensors 14 and 16, spacers 46 and 48, and axle 10 are secured or clamped to the leaf spring assembly 12 by means of U-bolts 18.

The sensors 20 and 22 are similarly constructed and arranged.

Referring to FIG. 1, it will be seen that hydraulic line 52 interconnects the chamber 28 of load sensor 14 and the chamber of load sensor 20. Similarly, hydraulic line 54 provides communication between the hydraulic chamber 40 of sensor 16 and the corresponding chamber of sensor 22. Hydraulic line 52 is connected through valve 58 to line 56 which, in turn, is connected to a load indicator device 60. Hydraulic line 54 interconnecting the load sensors 16 and 22 is connected through a hydraulic line 62 to the indicating device 60. A cut-off valve 64 is interposed in line 62.

Indicating device 60 includes a cylinder 66 having a piston 68 slidable therein. An indicator arm 70 is pivotally supported at 72 and has one end 74 that engages the piston 60. The opposite end of indicator arm 60 has a pointer portion that cooperates with a scale 76 that is calibrated to indicate the static loading on the axle 10.

OPERATION

The several load sensors 14, 16, 20 and 22 as well as the several hydraulic lines 52, 54, 56, 62 and cylinder 66 are filled with hydraulic fluid. It will be seen that downward movement of the spring 12 relative to the axle 10 caused by an increase in the static load on the vehicle will result in the reduction in the volume of chamber 28 of sensor 14. A similar decrease in the volume of the chamber in sensor 20 will also take place. Correspondingly, the volume of the chamber 40 of sensor 16 and the volume of the chamber within sensor 22 will increase. These several volume changes will occur as a result of the flexibility of the members 26 and 38.

In order to accommodate the changes in volume, it is assumed that the valves 58 and 64 are open. Referring to FIG. 2, when the volume of chamber 28 is decreased fluid will flow through the hydraulic line 52, valve 58 and line 56 to the cylinder 66. This will cause the piston 68 to move to the right. A corresponding volume of fluid will flow through the hydraulic lines 62 and 54 to the chamber 40 of the load sensor 16 as the piston 68 is displaced. Movement of the piston, in turn, will cause the indicator arm 70 to be displaced in a counter-clockwise direction. The end of the arm 70, in cooperation with the scale 76, will indicate an increase in vehicle static loading.

The reading of indicator device 60 is to be taken when the vehicle is stationary and the valves 58 and 64 are open. Once the load has been indicated and the vehicle is to be moved, valves 58 and 64 are closed. This has the effect of creating a solid hydraulic lock which locates the axle 10 in its deflected position relative to the leaf spring 12 of the suspension system. In this condition, indicator arm 22 will continue to register the applied static load while hydraulic pressure within the chambers 28 and 40 resists bump loads applied to the axle during the motion of the vehicle.

The valves 58 and 64 may be automatically controlled so that they are automatically opened when the vehicle is parked and automatically closed as soon as the vehicle moves or is about to move. For example, the valves 58 and 64 may be made responsive to the operation of the parking brake pedal of the vehicle.

Figure 3:
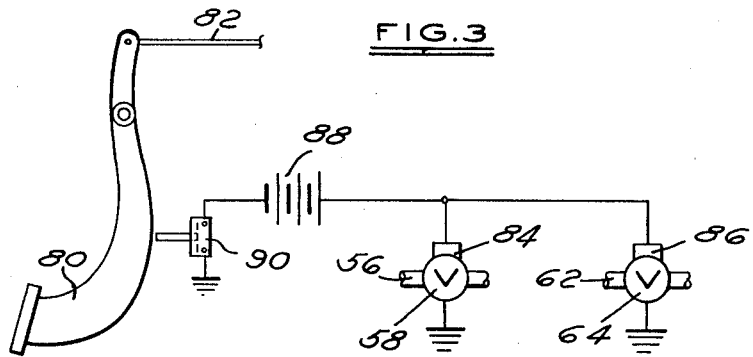
FIG. 3 is a schematic representation of an automatic system for controlling the hydraulic valves of FIGS. 1 and 2.

In FIG. 3, a parking brake lever 80 is pivotally supported to actuate a parking brake cable 82. Valves 58 and 64 are controlled by solenoids 84 and 86. The valves 58 and 64, under the control of solenoids 84 and 86, are constructed to be normally closed. The solenoids 84 and 86 are in parallel circuitry with an electrical power source such as the vehicle battery 88 and a normally opened switch 90. The switch 90 is constructed to be closed upon application of the parking brake pedal 80. When the parking brake pedal 80 is depressed, the switch 90 is closed causing the solenoids 84 and 86 to be activated which, in turn, opens the valves 58 and 64.

With the system of FIG. 3, the load measuring device of FIG. 1 automatically functions when the vehicle has its parking brakes applied. When the parking brake is released and the vehicle is about to be moved, the valves 58 and 64 are closed.

With the control system of FIG. 3, the hydraulic sensors 14, 16, 20 and 22 will be automatically "locked" so that no deflection will occur between the ring 12 and the axle 10 when the vehicle is moving or is about to move.

It is also to be appreciated that the control switch 90 could be connected to the speedometer and made vehicle speed responsive whereby the valves 58 and 64 would automatically close when the vehicle is in motion. An alternate construction would connect the control switch 90 to the ignition switch of the vehicle whereby whenever the ignition switch is in the "run" position, the valves 58 and 64 would be closed.

The foregoing description presents the presently preferred embodiment of this invention. Modifications and alterations may occur to those skilled in the art which will come within the scope and spirit of the following claims:

We claim:

1. A load indicating mechanism for a motor vehicle having sprung and unsprung components including an axle, said axle being constructed to rotatably support a road wheel at each of its outer ends, a vehicle body support spring positioned adjacent each end of said axle and connected to said sprung components, each end of said axle having a pair of hydraulic load sensing devices situated one above and one beneath said axle, separate mounting means securing each of said springs and the adjacent pair of load sensing devices to said axle, each of said hydraulic load sensing devices having an expansible chamber constructed to change in volume in response to the amount of load on said sprung components, the expansible chambers of the upper load sensing devices being interconnected, the expansible chambers of the lower load sensing devices being interconnected, said chambers being connected to a hydraulically operated load indicating device, said load indicating device having means for displaying load information in response to the flow of fluid into and out of said chambers.

2. A load indicating mechanism for a motor vehicle according to claim 1 and including:
   valve means constructed to prevent the flow of fluid into and out of said chambers.

3. A load indicating mechanism for a motor vehicle according to claim 1 and including:
   valve means constructed to prevent the flow of fluid into and out of said chambers, automatic valve actuating means connected to said valve means and constructed to normally maintain said valve means in a closed condition.

4. A load indicating mechanism for a motor vehicle having sprung and unsprung components including an axle, said axle being constructed to rotatably support a road wheel at each of its outer ends, a vehicle body support spring positioned adjacent each end of said axle and connected to said sprung components, each end of said axle having a pair of hydraulic load sensing devices situated one above and one beneath said axle, separate mounting means securing each of said springs and the adjacent pair of load sensing devices to said axle, each of said hydraulic load sensing devices having an expansible chamber constructed to change in volume in response to the amount of load on said sprung components, the expansible chambers of the upper load sensing devices being interconnected, the expansible chambers of the lower load sensing devices being interconnected, said chambers being connected to a hydraulically operated load indicating device, said load indicating device having means for displaying load information in response to the flow of fluid into and out of said chambers, valve means constructed to prevent the flow of fluid into and out of said chambers, automatic valve actuating means connected to said valve means and constructed to normally maintain said valve means in a closed condition, said valve actuating means being responsive to a pre-established operating condition of said vehicle to open said valve means.

5. A load indicating mechanism for a motor vehicle according to claim 4 and including:
   said vehicle having brake applying means, said valve actuating means being constructed to be responsive to the actuation of said brake applying means to open said valve means.

* * * * *